United States Patent
Diep et al.

[11] Patent Number: 5,536,482
[45] Date of Patent: Jul. 16, 1996

[54] PROCESS FOR POLLUTION CONTROL

[75] Inventors: Daniel V. Diep, Aurora; M. Linda Lin; Per B. Christiansen, both of Naperville, all of Ill.

[73] Assignee: Nalco Fuel Tech, Naperville, Ill.

[21] Appl. No.: 959,705

[22] Filed: Oct. 13, 1992

[51] Int. Cl.⁶ .................................. C01B 21/00
[52] U.S. Cl. .................... 423/235; 423/239.1
[58] Field of Search ............... 423/235, 235 D, 423/239.1

[56] References Cited

U.S. PATENT DOCUMENTS

| | | | |
|---|---|---|---|
| 3,284,393 | 11/1966 | Vanderhoff et al. | 260/29.6 |
| 3,734,873 | 5/1973 | Anderson et al. | 260/29.6 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,640,793 | 2/1987 | Persinski et al. | 252/82 |
| 4,719,092 | 1/1988 | Bowers | 423/235 |
| 4,734,103 | 3/1988 | Fong et al. | 44/51 |
| 4,777,024 | 10/1988 | Epperly et al. | 423/235 |
| 4,780,289 | 10/1988 | Epperly et al. | 423/235 |
| 4,829,121 | 5/1989 | Fong | 524/555 |
| 4,842,834 | 6/1989 | Burton | 423/235 |
| 4,844,878 | 7/1989 | Epperly et al. | 423/235 |
| 4,877,591 | 10/1989 | Epperly et al. | 423/235 |
| 4,915,036 | 4/1990 | DeVita | 110/215 |
| 4,929,655 | 5/1990 | Hisadtakeda et al. | 524/458 |
| 4,985,218 | 1/1991 | DeVita | 423/235 |
| 4,992,249 | 2/1991 | Bowers | 423/235 |
| 4,997,631 | 3/1991 | Hofmann et al. | 423/235 |
| 4,997,890 | 3/1991 | Fong et al. | 525/344 |
| 5,006,590 | 4/1991 | Hisadtakeda et al. | 524/458 |
| 5,441,713 | 8/1995 | Dubin et al. | 423/235 |

FOREIGN PATENT DOCUMENTS

| | | | |
|---|---|---|---|
| 49-30147 | 3/1974 | Japan . | |
| 52-33890 | 3/1977 | Japan | 423/235 |
| 835478 | 6/1981 | U.S.S.R. | 423/235 |
| 9117814 | 11/1991 | WIPO . | |
| 9202291 | 2/1992 | WIPO . | |

OTHER PUBLICATIONS

Translated Abstract of above mentioned Japanese patent 4930147. (Mar. 1974).

*Primary Examiner*—Gary P. Straub
*Assistant Examiner*—Thomas G. Dunn, Jr.
*Attorney, Agent, or Firm*—St. Onge Steward Johnston & Reens

[57] ABSTRACT

Improved processes and improved compositions reduce the environmental damage caused by large-scale combustion, especially in the field of $NO_x$ reduction by selective non-catalytic reduction (SNCR) in the gas phase. In one aspect, the process improves the reliability of known means, compositions and methods for reducing the concentration of pollutants in a gas stream by: preparing an aqueous solution comprising a pollutant-reducing agent and a water-dispersible polymer, and introducing the solution into the gas stream. Preferred polymers comprise high molecular weight polymers selected from the group consisting of homo and copolymers of acrylic acid and acrylamide with RSV values of at least 10, sodium acrylate acrylamide copolymers with RSV values of at least 10, sulfonmethylated acrylamide/acrylamide/acrylic acid terpolymers of RSV of at least 18, alkylene oxide polymers and copolymers, and mixtures of any of these and like polymers.

10 Claims, 1 Drawing Sheet

5,536,482

PROCESS FOR POLLUTION CONTROL

TECHNICAL FIELD

The invention relates to reducing the environmental damage caused by large-scale combustion, and provides both improved processes and improved compositions for achieving this, especially in the field of $NO_x$ reduction by selective noncatalytic reduction (SNCR) in the gas phase.

Carbonaceous materials, including the typical hydrocarbon fuels such as coal, oil and gas, as well as refuse, are burned in increasing amounts each year. At the high temperatures (e.g., 1000° to 1700° C.) normally encountered in large scale combustors, nitrogen oxides ($NO_x$) formation is greatly increased because the conditions favor formation of free radicals of oxygen and nitrogen and their chemical combination as nitrogen oxides.

In order to reduce the formation of $NO_x$, both primary and secondary measures have been employed. Primary measures are those which modify combustion itself and may involve using an excess of air or fuel or a combination of both in staged combustion. However, such measures tend to produce undesirable levels of carbon monoxide and nitrous oxide. There is no known primary method which by itself enables reducing both $NO_x$ and carbon monoxide to acceptable levels without serious economic drawbacks.

A number of economically-attractive secondary measures have been developed which enable combustion to take place under efficient conditions, with resultant $NO_x$ generation, but then reduce the $NO_x$ by conversion into other compounds which can either be emitted or eliminated from the flue gas. Of these, selective gas phase reactions—both catalytic (SCR) and non-catalytic (SNCR)—are advantageous because they permit reduction of $NO_x$ while using relatively low levels of chemical reducing agents. The SNCR procedures are especially effective and economical. The catalytic processes are less desirable in many installations because they require extensive capital equipment, large spaces for installation and are subject to fouling.

However, the attainment of consistent, high reductions in $NO_x$ with SNCR procedures is a matter of considerable engineering and chemistry. These reactions occur in the gas phase and typically involve $NO_x$ levels of 20 to 1500 parts per million by volume ($ppm_v$) and either urea or ammonia at from one to three times the amount stoichiometrically required. The reactions require mating of the reactive materials in high dilution in the gas phase, and typically start with the $NO_x$-reducing agents in aqueous droplets.

The use of droplets is advantageous because the water helps protect an active agent from the intense heat until it is delivered to the desired location for reaction. However, droplets which are too small tend to evaporate too soon, and those which are too large can impact and damage equipment. Both deviations from proper droplet size cause reactions to occur under less than optimum conditions.

For best results, the water must be evaporated from the droplets and the active agent converted to the gas phase to achieve contact with the $NO_x$ molecules in the temperature range effective for reaction, e.g., from 900° to 1050° C. The mechanism of conversion is straight forward at these high temperatures, but the engineer must deal with high turbulence, high gas velocities, and high temperature gradients both parallel with and transverse to the direction of bulk gas flow. Moreover, all of these parameters are subject to change with changes in combustion rate (e.g., load). This complex set of conditions greatly frustrates the need to introduce the active agents in droplets which are capable of surviving to the desired location in the boiler and there releasing the active agents in the gas phase.

Effective and economical reaction in the gas phase depends on good droplet size distribution to achieve good mixing of reducing agents with the effluent gases. Incomplete or non-uniform mixing can cause a number of adverse results including poor chemical utilization, the release of ammonia into the atmosphere, and damage to equipment through corrosion or the formation of deposits on heat exchange and other surfaces by direct chemical impingement and precipitate formation. Moreover, if the fuels contain significant amounts of sulfur, ammonia can react with the sulfur and form solid ammonium sulfate and/or bisulfite which deposit on heat exchange surfaces and can quickly reduce heat transfer efficiency.

There remains a need for improvement in controlling droplet sizes and velocities to effectively deal with complexities of industrial installations.

BACKGROUND ART

Prominent among the selective non-catalytic reduction (SNCR) processes are those disclosed for example by Lyon in U.S. Pat. No. 3,900,554 and by Arand et al in U.S. Pat. Nos. 4,208,386 and 4,325,924. Briefly, these patents disclose that ammonia (Lyon) and urea (Arand et al) can be injected into hot combustion gases to selectively react with $NO_x$ and reduce it to diatomic nitrogen and water.

The SNCR process described by Lyon in U.S. Pat. No. 3,900,554 reduces the concentration of nitrogen monoxide (NO) in combustion gases. Lyon discloses injecting ammonia or certain ammonia precursors or their aqueous solutions into an oxygen-rich waste gas for selective reaction with the nitrogen monoxide at a temperature in the range of from 870° to 1100° C. In this process, it is important that the temperature of the combustion effluent lie within a narrow "temperature window" during the contact with the gaseous ammonia. The limiting values of the window can be reduced by the addition of certain substances. Distribution of the ammonia within the combustion effluent is critical to achieving maximum utilization of the ammonia and reduction of NO within the defined temperature window. Ineffective utilization will increase costs and cause other problems associated with ammonia discharge.

Arand et al disclose in U.S. Pat. No. 4,208,386 that urea can be added alone or in solution to oxygen-rich effluents in a temperature range from 700° to 1100° C. Any urea which fails to react with $NO_x$ within the temperature window is, nonetheless chemically transformed by heat and some, during cooling, results in ammonia formation. Again, here, as with the Lyon process, distribution is critical to selective reduction and, therefore, to economic operation and avoidance of the problems associated with ammonia discharge and fouling.

Similarly, in U.S. Pat. No. 4,325,924, Arand et al describe an SNCR process utilizing urea in fuel-rich combustion effluents. Effluents of this type can be generated by staged combustion, which can lead to the formation of high levels of carbonaceous pollutants. Again, distribution is critical and, if ineffective, can have adverse economic as well as environmental impact.

A number of other disclosures in the field of SNCR suggest improvements over the aforementioned processes. For example, in U.S. Pat. No. 4,992,249, Bowers discloses that if droplet size is increased and urea concentration is decreased, good results can be achieved in oxygen-rich effluents at higher temperatures than disclosed by Arand et al. Distribution, however, remains critical here, and there is a need to better control droplet size.

In a further modification, Bowers discloses in U.S. Pat. No. 4,719,092 that an additional material, an oxygen-containing hydrocarbon, can be injected together with an aqueous urea solution to reduce residual ammonia concentration in the effluent. Despite the added material, distribution and droplet size distribution remain important.

In an effort to achieve better distribution by injection, DeVita describes an injector in U.S. Pat. No. 4,915,036 which shows good distribution of injected fluids while the danger of clogging is minimized. This specification discloses the need for good distribution of chemicals and enables improving it where boiler geometry permits. Similarly, in U.S. Pat. No. 4,842,834, Burton describes an injector which, while effective in many combustor configurations, could benefit from the provision of an additive for the aqueous solutions employed which could improve droplet size distribution. And, in WO 91/17814, Chawla et al describe a nozzle which enables injection of a two-phase mixture of air and aqueous $NO_x$-reducing composition into an effluent at sonic velocity to achieve an improved distribution of particle sizes, but could also benefit from such an additive.

There remains a present need for a process to effectively minimize combustion-generated pollutants, such as nitrogen oxides, while simultaneously minimizing secondary pollutants, such as carbon monoxide and ammonia, in the final effluent by achieving more uniform distribution of pollutant reducing agents at the effective temperature ranges for the chemicals concerned, especially in effluent passages having geometries and load-determined temperature profile characteristics which adversely impact distribution.

DISCLOSURE OF INVENTION

It is an object of the invention to improve the introduction and utilization of pollutant-reducing chemicals in hot combustion effluents.

It is another object of the invention to improve the reliability of SNCR $NO_x$-reducing installations which depend on the introduction of aqueous solutions of $NO_x$-reducing agents into a high temperature environment.

Another object is to mitigate utilization and distribution problems normally associated with SNCR processes.

These and other objects are achieved by the present invention which provides improved processes and compositions.

In one broad aspect, the invention provides a process for improving the reliability of known means, compositions and methods for reducing the concentration of pollutants in a gas stream by: preparing an aqueous solution comprising a pollutant-reducing agent and a water-dispersible polymer, and introducing the solution into the gas stream.

In one preferred form of the invention, the solution comprising the pollutant-reducing agent and the water-dispersible polymer is mixed with air and injected as a dispersion of liquid droplets in a gas stream at or near the sonic velocity of the mixture, into a passage containing a combustion effluent at a temperature effective for reducing a pollutant concentration.

BRIEF DESCRIPTION OF THE DRAWING

The invention will be better understood and its advantages will become more apparent when the following detailed description is read in conjunction with the accompanying drawings, in which.

BEST MODE FOR CARRYING OUT THE INVENTION

Effluents in need of treatment are produced by a variety of sources including large industrial and utility boilers, circulating fluidized bed boilers, and gas turbines. It will be understood, though, that although written in terms of the reduction of nitrogen oxides in the effluent from the combustion of a carbonaceous fuel, the invention is applicable in any high temperature environment having nitrogen or sulfur oxides, or other pollutant that can be treated by selective gas-phase reaction. Temperatures will typically be greater than about 800° C. and can be as high as about 1100° C., even 1200° C. and higher.

As set forth in the references identified above, the known processes involve preparing a treatment composition (typically as an aqueous solution), transporting the composition to a gas stream (e.g., a combustion effluent) through conduits effective for this purpose, and introducing the composition into the gas stream at a concentration and at a rate effective to reduce pollutant concentration under the conditions prevailing in the gas stream.

In most processes of this type, the treatment composition is introduced into the effluent by an injector which generally comprises a conduit, sometimes fitted at the tip with a nozzle, extending into an effluent gas stream. In some cases a portion of effluent or other gas is employed to help atomize and disperse the treatment composition. The spray or injection pattern is defined with precision, often with the aid of computer to assure good distribution and reaction. The present invention helps improve operation by providing a more predictably-defined pattern.

Apparatus of varying degrees of sophistication are known for introducing $NO_x$-reducing compositions into a high temperature environment. Some comprise coaxial, multitubular structures, such as those disclosed by Burton in U.S. Pat. No. 4,842,834, by DeVita in U.S. Pat. No. 4,985,218, and by Chawla et al in WO 91/17814, the disclosures of each of which are incorporated herein by reference.

To maximize $NO_x$ reduction, the art has also developed systems which introduce chemicals in stages (U.S. Pat. No. 4,777,024 to Epperly et al), and with variation in location of injection and chemical formulation as is necessary to meet the temperature and compositional variations in the gas stream being treated (U.S. Pat. No. 4,780,289 to Epperly et al).

These processes are all improved by incorporating in the solution an effective water-dispersible polymer in an amount sufficient to increase the size of the droplets and provide a narrow distribution of droplet sizes.

For the purposes of this description, all temperatures herein are measured using a suction pyrometer employing a k-type thermocouple. Droplet sizes are determined with a Malvern 2600 instrument, utilizing a Fraunhofer diffraction, laser-based system. And, unless otherwise indicated, all parts and percentages are based on the weight of the composition at the particular point of reference.

Figure 1:
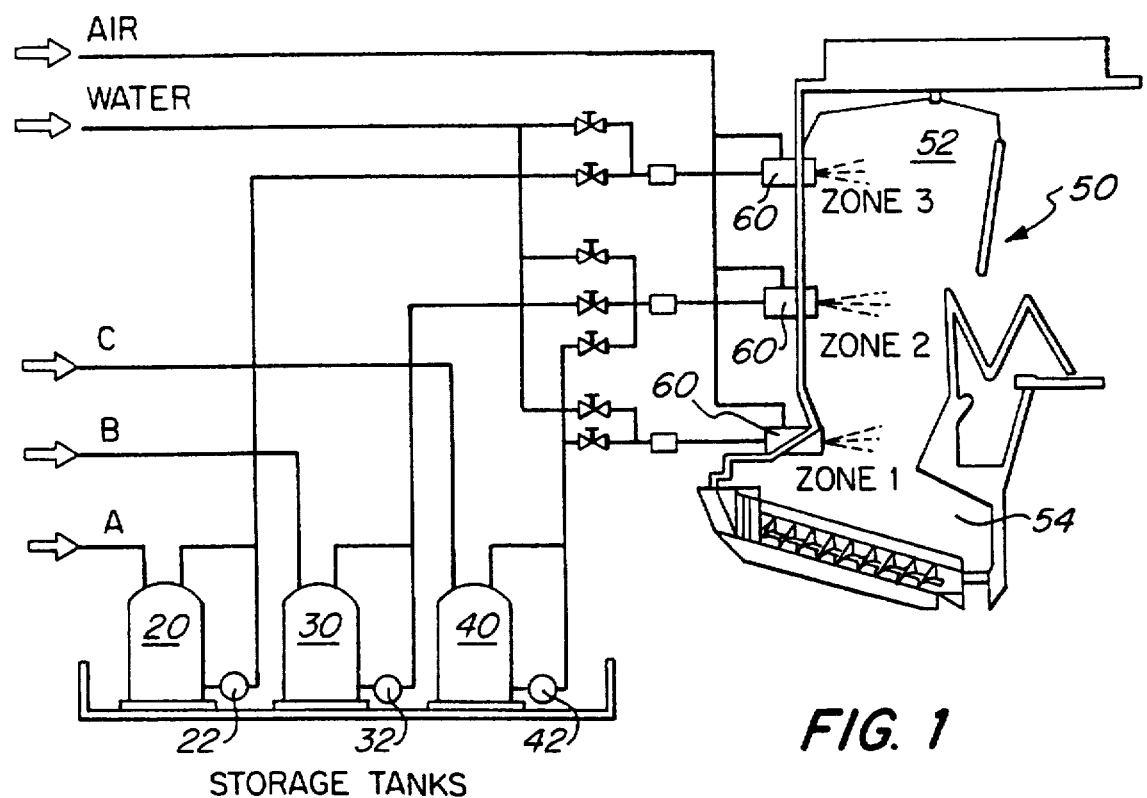
FIG. 1 is a flow chart of a process scheme according to the invention.

FIG. 1 shows a representative multistage treatment in a large combustor. This figure shows the final mixing and introduction of three individual active components. These are shown as being provided from individual sources A, B and C and stored in tanks 20, 30 and 40, which are associated with metering pumps 22, 32 and 42 as well as suitable conduits, and valves to enable mixing in the manner called for by a controller (not shown) or manual operation. The temperature of effluent at the point of injection, the concentration of active component in the solution, and the size of the droplets in the dispersion, are selected to achieve reduction in nitrogen oxides or other pollutant levels in the effluent.

Figure 2:
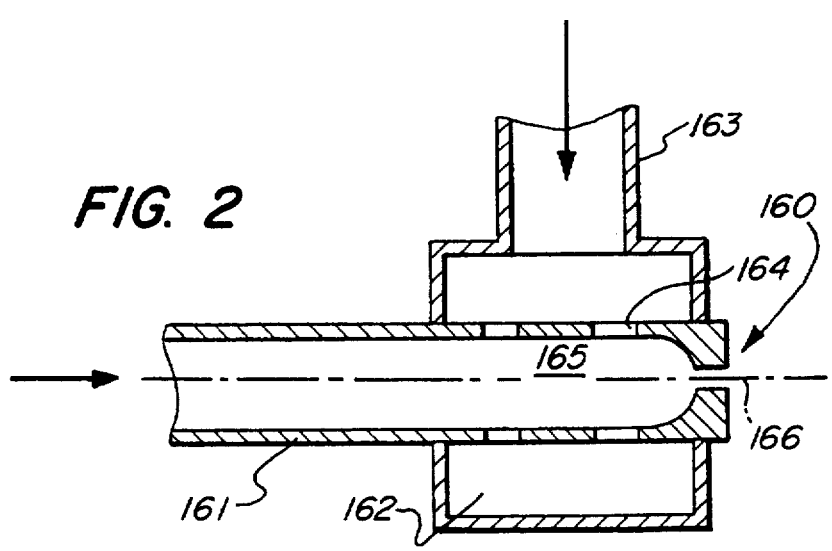
FIG. 2 is a cross-sectional view of the detail of an exemplary nozzle for use in the invention.

One exemplary injection apparatus for use according to the invention is described in the above-identified disclosure of Chawla et al and is capable of supplying a pollutant-reducing agent comprised of one or more active components in a two-phase mixture of liquid and gaseous components. A nozzle of this type is shown in FIG. 2 and will be described in greater detail below. The liquid component of a two-phase mixture in the case of Chawla et al, Burton or DeVita injectors, or a single-phase, liquid component in the case of other nozzles not requiring a gas, typically comprises a solution having at least one pollutant-reducing agent effective in reducing $NO_x$ and/or $SO_x$ under the conditions of injection, may contain enhancers to best match the pollutant-reducing agent to the effective temperature window, and also usually includes various additives to protect the system against blockage.

The active pollutant-reducing agent, e.g $NO_x$-reducing agent, is desirably incorporated in the liquid phase. In one embodiment, a $NO_x$-reducing agent is introduced as an aqueous treatment solution, such as urea or other NH-containing composition in water with one or more enhancers. It is possible, consistent with effectiveness, to employ either of the liquid or gaseous components as a multiphase mixture. For example, the liquid component can include suspended solids or an immiscible fluid material. The gaseous component can be similarly complex.

Various NH-containing compositions, in their pure and typical commercial forms, will generate effective gas-phase agents (e.g., the amidozine radical) when introduced in aqueous solution and subjected to elevated temperatures. Among the prominent NH-containing compositions are those selected from the group consisting of ammonia, ammonia precursors, urea, urea precursors, urea hydrolysis products, products of reaction of urea with itself or other compositions, related compositions, and mixtures of these. Among these compounds are ammonium carbonate, ammonium formate, ammonium citrate, ammonium acetate, ammonium oxalate, other ammonium salts (inorganic and organic) particularly of organic acids, ammonium hydroxide, various stable amines, guanidine, guanidine carbonate, biguanide, guanylurea sulfate, melamine, dicyanimide, calcium cyanamide, biuret, 1,1'azobisformamide, methylol urea, methylol urea-urea, dimethyl urea, hexamethylenetetramine (HMTA), and mixtures of these.

Among the hydrolysis products are ammonia, carbamates such as ammonium carbamate, ammonium carbonate, ammonium bicarbonate and other ammonia salts, various urea complexes and half ammonia salts. The exact form of some of these compounds is not known because the techniques employed to analyze them can affect their makeup. U.S. Pat. No. 4,997,631 to Hofmann et al and PCT application WO 92/02291 to yon Harpe et al, are incorporated herein by reference.

Enhancers are additive materials which modify the effectiveness of a pollutant-reducing agent in terms of its effective temperature window, its utilization efficiency, or the like. Among the enhancers are the above materials when used in suitable combination, oxygenated hydrocarbons, and mixtures of these. Exemplary of the oxygenated hydrocarbons are ketones, aldehydes, alcohols including polyols, carboxylic acids, sugars, starch hydrolysates, hydrogenated starch hydrolysates, sugar-containing residues such as molasses, and mixtures of any of these. The entire disclosures of U.S. Pat. Nos. 4,719,092, 4,844,878 and 4,877,591 are incorporated herein by reference.

Referring again to FIG. 1, the various treatment solutions are premixed to include the $NO_x$-reducing composition and enhancer most appropriate for the range of temperatures expected to be encountered at its respective introduction into zones 1, 2, or 3. The concentration of the compositions at the points of introduction can be finally adjusted as desired by water from the common source shown. The solution in the storage vessels will also preferably contain the water-dispersible polymers according to the invention. It is possible, of course to meter these in on a real-time basis in the concentration required. It is an advantage of the invention that these water-dispersible polymers are highly and rapidly dispersible in water throughout their full range of effective concentrations.

The water-dispersible polymers of the invention are those which have the ability to increase the survivability of the droplets to a position farther downstream in the hot combustion gases than is achieved without the polymer. Significantly, the polymers increase the size of the droplets formed, reduce the number of very small droplets, and preferably, also narrow the distribution of droplet sizes formed upon injection.

These features enable the introduction of $NO_x$-reducing agent at high temperature by protecting it in aqueous solution longer than can be achieved without the polymer and permit better process control by delivering more uniformly-sized droplets and better spray penetration into the intended temperature zone. With the addition of the polymer, the resulting uniformly-sized droplets tend to release the active, gaseous $NO_x$-reducing species from solution within a more narrow temperature window and at higher temperatures. By proper monitoring of temperatures and control of droplet sizes, more of the $NO_x$-reducing agent is thereby available for its intended purpose and less is released as ammonia slip or converted to $NO_x$ as can result from gas phase reactions outside the desired temperature range.

A wide variety of water-dispersible polymers are available which are effective to either increase survivability of droplets or improve droplet size distribution as described. The preferred polymers provide both of these advantages.

Among the polymers suitable for one or both of these effects are high molecular weight substituted and unsubstituted water soluble polymers including: vinyl polymers based on acrylic and lower (e.g. 1–4 carbon) alkylacrylic acids, acrylamide and lower alkylacrylamides, styrene, esters of any of these, and mixtures of two or more of these; polyethers, including alkylene oxide polymers such as homo and copolymers of ethylene oxide and propylene oxide; and mixtures of these and polymers of like monomers which have high molecular weights, e.g. greater than 500,000. The polymers are highly polar due to their ionic character or the presence of polar ether or like groups. Among the substituted polymers are those with sulfo or sulfoalkyl (e.g., sulfomethyl or sulfoethyl) substitutions to a portion of the acid or amide group of polymers of the above type. U.S. Pat. Nos. 3,734,873, 4,734,103, 4,829,121 and 4,997,890 are incorporated by reference to show the preparation of suitable polymers.

Among the suitable polymers are ionic polymers, both anionic and cationic, including acrylic homo and copolymers. The anionic polymers are preferred in solutions containing significant hardness, e.g., total hardness values of about 100 ppm (as $CaCO_3$) and above. Among the acrylic polymers are anionic copolymers of acrylic acid and acrylamide, such as those available from Nalco Chemical Company (Naperville, Ill.) as 7177PULV, 7744, and 8173 and cationic polymers of dimethylaminoethylacrylic acid and methychloride quat/acrylamide, such as those from Nalco Chemical Company under the designations 7110, 7191, 7193 and 7194. Also suitable are AcAM/DMAEA BCQ/DMAEA MCQ polymers where AcAM identifies aceylate-acrylamide, DMAEA BCQ indicates dimethylaminoacrylate benzyl chloride quat, and DMAEA MCQ refers to dimethylaminoacrylate methyl chloride quat. See, for example, U.S. Pat. Nos. 4,929,655 and 5,006,590. The anionic polymers, to give best results, should have an RSV (Reduced Specific Viscosity determined in 1N $NaNO_3$ at a concentration of 0.045 g of polymer as the sodium salt per 100 cc) of at least 10–13, and preferably at least 25. The cationic polymers should have an RSV of at least 10 as measured in 1N $NaNO_3$ by Ubbelohde size 75 Viscometer at 30° C. Among the polyethers are high molecular weight (e.g. 100,000 to 10 million, preferably at least 1 million) ethylene oxide polymers, such as those available from Union Carbide, Specialty Chemicals Division (Danbury, Conn.) under the designations Polyox WSR and Ucarfloc. Also effective are lower molecular weight polyethers available from Union Carbide as UCON food grade lubricants and polyethylene glycols available from Union Carbide as Carbowax polyethylene glycols. The terms polyethylene glycol and poly(ethylene oxide) and the corresponding terms for alkylene or propylene oxides, are used interchangeably herein.

A preferred group of anionic polymers are alkali metal salts of copolymers of acrylic acid (AA) and acrylamide (AM) with a mole ratio of AA to AM in the range of 1:10 to 2:1 with RSV's of at least about 25. Latex forms of these polymers are effective but must be inverted in water to free the polymer for dispersion within the water. The latexes are typically polysoap stabilized water-in-oil emulsions with the polymer being dissolved in a suitable solvent such as LOPS (Low Odor Parafinic solvent). To form the aqueous solutions of the invention, the latex is dispersed in water and the resulting dispersion is then subjected to shear sufficient to break the emulsion and enable the polymer to be dispersed uniformly throughout the water.

Among the suitable polymers are "prism" polymers such as water soluble terpolymers containing the following repeating units in the following percentages:

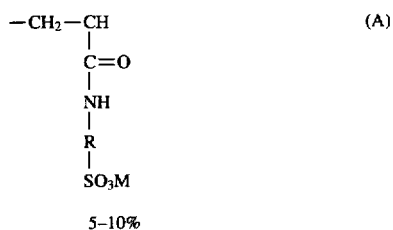

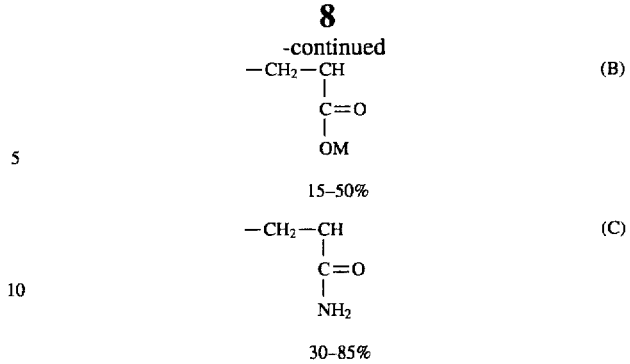

wherein R is a lower alkylene group from 1–6 carbon atoms. R is preferably ethylene. M is H, $NH_4$ or alkali metal, said terpolymer having a Reduced Specific Viscosity of at least 25. These terpolymers having the above described formula, preferably contain between 10–30 mole percent by weight of (A), 20–30 mole percent of (B), and 30–70% of (C). These polymers, to give the best results, should preferably have a RSV (Reduced Specific Viscosity determined in 1N $NaNO_3$ at a concentration of 0.045 g of polymer as the sodium salt per 100 cc) of at least 30.

These terpolymers are typically employed as water-in-oil emulsions that contain 25 to 30% polymer. More detail as to the preparation of these polymers is given in U.S. Pat. Nos. 3,284,393, Re. 28,474 and Re. 28,576. Also suitable are high molecular weight (RSV of at least 18) sulfonated polymers such as 2-acrylamido-2-methyl propane sulfonic acid (AMPS).

Polymers such as ionic AA/AM copolymers and prism polymers have the further advantage of enabling greater flow rates. The high molecular weight polyethers have the added advantage that they can increase the velocity of injection.

The water-dispersible polymer will be employed in an amount effective to increase survivability of the droplets, typically in an amount of from about 10 ppm to about 1000 ppm, and more narrowly from about 50 ppm to about 500 ppm, based on the weight of the solution.

It is preferred that the pollution control composition be dispersed from a nozzle to provide droplets having an average droplet size within the range of from about 5 to about 10,000 microns Sauter mean diameter, and a relative span of droplet sizes of less than 2. Most preferably, the median droplet size will be within the range of from about 200 to 1000 microns. The term "relative span" refers to the distribution of droplet sizes—the lower the value, the more nearly the same they are. This term is defined more precisely in Example 1.

Viewed from another perspective, the invention provides a greater degree of reliability to processes and apparatus which employ or are used in connection with aqueous solutions of the type described. This is achieved in the present case by providing the ability to better control placement of droplets of the proper size to achieve the objective of the pollutant-reducing agent, as opposed to the maintenance of clear transport and injection apparatus which was the objective of copending, commonly assigned U.S. patent application Ser. No. 07/770,857, entitled "Hardness Suppression In Urea Solutions", filed Oct. 3, 1991 by Dubin, et al. now U.S. Pat. No. 5,441,713.

The advantages of the present invention are additive to those of the above-referenced Dubin, et al application wherein it is disclosed that water hardness problems are exacerbated by the presence of urea and other NH-containing compositions. Accordingly, it is preferred to incorporate in the solutions of the invention a hardness-suppressing composition comprising at least one member selected from the group consisting of polymers, phosphonates, chelants, phosphates and mixtures of any two or more of these, in an amount effective to suppress hardness. Thus, single members of this group can be employed where effective, or two or more members of a single group can be employed, as well as mixtures of members from different groups. The disclosure of the Dubin et al application is incorporated herein by reference.

Among the various hardness-suppressing compositions are: one or more polymers; combinations of one or more polymers and one or more phosphonates; combinations of one or more polymers, one or more phosphonates, and one or more chelants; combinations of one or more polymers, one or more phosphonates, one or more chelants and one or more phosphates; combinations of one or more polymers, one or more phosphonates, and one or more phosphates; combinations of one or more polymers and one or more chelants; combinations of one or more polymers and one or more phosphates; combinations of one or more polymers, one or more chelants and one or more phosphates; one or more phosphonates; combinations of one or more phosphonates and one or more chelants; combinations of one or more phosphonates and one or more phosphates; and combinations of one or more phosphonates, one or more chelants, and one or more phosphates. In addition, certain phosphates, alone or in combination, are effective and can be employed for scale conditioning and control as well as corrosion control. Similarly, chelants can, alone or in various combinations, have limited effectiveness.

The hardness-suppressing composition is preferably employed at a level effective to suppress hardness. Preferably, a polymer and a phosphonate are employed in combination at a weight ratio of within the range of from 1:25 to 25:1, but the preferred ratio is 4–6:1. Ratios outside these ranges can be employed so long as at least a minimum effective amount of each component in the combination is employed. When a concentrate is prepared for final dilution, it is desired to employ enough of the hardness-suppressing composition to be effective in the concentrate and all contemplated degrees of dilution.

In the preferred embodiments, surfactants are also employed to aid in maintaining dispersion of solution components, and pH modifiers such as monoethanolamine are employed in amounts effective to achieve long-term stability, especially when subjected to temperature extremes of from freezing to 120° F. One preferred hardness-suppressing formulation comprises 83% deionized water, 2.5% of a 60% solution of 1-hydroxyethylidene-1,1-diphosphonic acid (HEDP), 10% of a 63% active solution of polyacrylic acid (prepared using organic peroxide/isopropanol catalyst) (approximate MW 2000), 1% Igepal CO-730 nonionic surfactant (nonyl phenol ethoxylate), 1% aroma enhancer, 1.5% monoethanolamine, and 1% Dowfax 3B2 anionic sulfonate surfactant (alkylated diphenyl oxide disulfonates). Among other specific embodiments are: using 2-phosphono-1,2,4-tricarboxybutane (PBTC) in place of the HEDP; using AMP in place of the polyacrylic acid; and, using a low molecular weight polyacrylic acid made in aqueous media with bisulfite/persulfate catalyst and PBTC. In each of these specific embodiments, the hardness-suppressing formulation is employed at a level of from about 0.1 to 5% (e.g., 0.5%) in a solution containing about 50% urea.

The $NO_x$-reducing composition improved by the invention will typically be prepared and shipped as a concentrate which is diluted for use. Typically, these concentrates will contain 25 to 65% urea, 10 to 1000 ppm of a water-dispersible polymer of the invention, and 0.05 to 1.0% of an effective hardness-suppressing composition, more preferably from 40 to 55% urea, e.g., 50%, from 50 to 500 ppm of the water-dispersible polymer, and from 0.1 to 0.75%, e.g., 0.5% of the hardness-suppressing composition. The urea and a separate additive package may be preblended to form this concentrate. This concentrate is typically diluted prior to injection as required to achieve a urea concentration effective under the injection conditions. Typically, dilution to concentrations of from 5 to 25% urea are effective. Lower concentrations (e.g., 1 to 5%) may be desired. Typically, the pH of the aqueous solution is above 5, and generally is within the range of from 7 to 11, e.g., 8 to 10.

The concentration of the reducing agent injected into the effluent should be sufficient to obtain a reduction, and preferably ensure a minimization, of the nitrogen oxide concentration. In particular, the reducing agents are employed in total amounts sufficient to provide a molar ratio of reducing agent to baseline nitrogen oxide content (i.e., prior to treatment at that stage) of about 1:4 to about 5:1. The ratio is preferably within the range from 1:2 to 2:1, even more narrowly 2:3 to 6:5. In most situations this amount will be distributed jointly by a number of nozzles from a number of points as is illustrated in FIG. 1.

As shown in FIG. 1, three zones of injection are provided at progressive spacing distances above the combustion flame. The temperature decreases with successive levels moving upward in the figure. As combustion proceeds, effluent rises upwardly in this drawing through the passage 52 defined by the combustor walls. There may also be other obstructions, such as banks of cooling tubes and the like, within the combustor and thus defining the area within the passage where chemical introduction must take place. Also, in some cases, the exact location of injection points cannot be chosen due to the need to cut through water-lined walls or tubes and other economic and operational factors. Accordingly, it is often necessary to penetrate large distances across the cross section of the combustor but yet have little spacing from obstructions in the direction of flow.

It is an advantage of the present invention that liquid droplets comprising $NO_x$-reducing agents can be injected at well-controlled particle size distributions and velocities to make the active agents available near the point of injection as well as at the far side of an effluent passage without large numbers of droplets impinging obstructions or surviving beyond the desired temperature window for $NO_x$ reduction to a lower-temperature area where ammonia would be generated.

FIG. 2 is the detail in cross section of an individual nozzle 160. Nozzles of this type are suitable for use in this invention, and discharge a two-phase mixture of gas and liquid at the characteristic sonic velocity of the mixture. For example, the speed of sound of a mixture of the two components is approximately 20 to 30 meters per second, based on a volumetric proportion of gas of between 30 and 80 percent. Since the outflow velocity of the mixture is equal to its speed of sound, i.e., sonic velocity, the abrupt pressure drop from the mixing chamber produces an intensive division of the liquid phase into small droplets. The mixture is preferably introduced at a pressure of between 30 and 60 psi.

The droplet diameter is effected essentially by this pressure drop and, as a result, is adjustable. It is an advantage of this invention that the water-dispersible polymer provides further adjustability in droplet size and enables narrowing the range of droplet sizes.

As shown in FIG. 2, the nozzle comprises a liquid conduit 161 surrounded at its end by an annular chamber 162, into which there opens a line 163 for the gas. The annular chamber 162 is connected to the interior of the conduit 161 by means of several transfer holes 164, so that the end region of the conduit 161 functions as a mixing chamber 165.

The ratio of gas flow to liquid flow should be adjusted such that, shortly before exit from the mixing chamber 165 through outlet 166, the ratio is appropriate for the chosen pressure drop to enable injection of the mixture at its sonic velocity.

Typically, a volumetric proportion of gas of between 30 and 80% is employed, i.e., in this case, the flow cross section occupied by the gas amounts to from 30 to 80% of the total flow cross section.

The absolute pressure ahead of the mixing chamber will typically be in the range of between approximately 1.6 and 40 bar, depending on the desired droplet size and the phase exchange area dependent on this. Pressures on the order of magnitude of from about 2 to about 15, e.g. from about 3 to about 5, bar will be customary.

At the outlet 166, the mixture expands into the effluent passage 52 in FIG. 1, in which a lower pressure prevails. The pressure drop produces a fine atomization when the mixture is expanded. Droplet sizes will be determined based on the requirements of temperature, effluent flow rate, spacing of downstream obstruction, $NO_x$-reducing agent concentration, and desired effect. Typically, droplets will be formed with median diameters of from about 5 to about 10,000 microns. For many applications median diameters within the range of from 10 to 125 microns, e.g., less than about 50 microns, are effective. In other applications, the preferred median droplet size will be within the range of from about 200 to about 1000 microns. It is also preferred that the relative span of droplet sizes be less than 2, e.g., 1.25 to 1.5. The injection at sonic velocity with the water-dispersible polymer enables effective limitation of oversized droplets.

The atomizing device shown in FIG. 2 serves only to illustrate one suitable form of nozzle. Depending on design and process requirements, the atomizing jet can also be designed and constructed differently. In particular, it is possible to incorporate either convergent or divergent sections of pipe at the end of the mixing chamber 165. Commercial nozzles of this type are NFTC 4.0 and NFTL-20-00-170 both available from Nalco Fuel Tech of Naperville, Ill. Also, other atomization techniques can be employed including nozzles which operate without a separate atomizing fluid.

All droplets should be fully evaporated and their gaseous form fully mixed before the effluent is cooled below the effective temperature window in the area of the heat exchange tubes. Thus, there are many instances where complete evaporation of all droplets must take place in under 1 second and frequently less than 500 milliseconds, e.g., on the order of 50 to 250 milliseconds. This is enabled by the present invention which disperses the liquid as droplets of uniform size.

The following examples are provided to further explain and illustrate the invention and some of its advantages, but are not to be taken as limiting in any regard. Unless otherwise indicated, all percentages are by weight.

EXAMPLE 1

A series of aqueous test solutions were prepared using the following water-dispersible polymers at dosages of 100 parts per million based on the weight of polymer in the active form (excluding the weight of carriers and diluents):

Nalco 7177 PULV sodium acrylate acrylamide copolymer latex (RSV=18),

Prism polysoap latex form terpolymer of sulfonmethylated acrylamide, acrylamide and acrylic acid (RSV=42.5), Polyox poly(ethylene oxide) WSR301, (4 million MW).

These solutions and a water control were sprayed into a test chamber using a NFTL-20-00-170 nozzle and the liquid and air flow data shown in the table below. The value $D_{v0.5}$ is the volume median diameter as measured by the Malvern laser technique used to measure all droplet sizes. The $D_{v0.1}$ value indicates the volume diameter of a spray droplet at 10% of the total liquid volume on a cumulative distribution curve. The $D_{v0.9}$ value indicates a droplet size at 90% of the total liquid volume on the cumulative distribution curve. The value identified as $D_{32}$ is the Sauter mean diameter. The value for relative span is calculated as the quotient of $(D_{v0.9}-D_{v0.1})/D_{v0.5}$. All droplet sizes are in microns.

TABLE 1

| Solution | Air (psi, cfm) | | Liquid (psi, gpm) | | $D_{v0.5}$ | $D_{v0.1}$ | $D_{v0.9}$ | $D_{32}$ | Relative Span |
|---|---|---|---|---|---|---|---|---|---|
| Water | 30 | 1.5 | 30 | 0.60 | 122 | 36 | 372 | 71 | 2.7 |
| | 40 | 1.8 | 40 | 0.65 | 95 | 26 | 331 | 53 | 3.2 |
| 7177 | 30 | 1.7 | 30 | 0.70 | 275 | 52 | 438 | 104 | 1.4 |
| | 40 | 2.0 | 40 | 0.80 | 270 | 42 | 437 | 92 | 1.5 |
| Prism | 30 | 1.7 | 30 | 0.70 | 288 | 59 | 443 | 110 | 1.3 |
| | 40 | 2.0 | 40 | 0.80 | 270 | 46 | 438 | 79 | 1.5 |
| Polyox | 30 | 1.6 | 30 | 0.65 | 264 | 59 | 434 | 120 | 1.4 |
| WSR301 | 40 | 2.0 | 40 | 0.75 | 254 | 51 | 320 | 104 | 1.5 |

EXAMPLE 2

In another test, under air pressure of 50 psi and liquid pressure of 40 psi, aqueous solutions of several cationic polymers (Nalco 7110, 7191 and 7194) were compared to the anionic Nalco 7177, with the results shown in Table 2.

TABLE 2

| Solution | $D_{v0.5}$ | $D_{v0.1}$ | $D_{v0.9}$ | $D_{32}$ | Relative Span |
|---|---|---|---|---|---|
| Water | 164 | 57 | 400 | 83 | 2.1 |
| 7110 | 255 | 71 | 429 | 129 | 1.4 |
| 7191 | 288 | 74 | 442 | 121 | 1.3 |
| 7194 | 232 | 56 | 420 | 83 | 1.6 |
| 7177 | 299 | 78 | 447 | 125 | 1.2 |

EXAMPLE 3

Three different types of polymers were tested using solutions of the indicated polymers at a concentration of 100 ppm based on the active polymer. The tests were run as indicated in Example 1.

The results at 30 psi for both air and water gauge pressures are summarized in Tables 3 and 3a and at 40 psi, in Tables 4 and 4a.

TABLE 3

| SOLUTION | MOLECULAR WEIGHT (MILLIONS) | % ACTIVE | $D_{vo.5}$ | $D_{vo.1}$ | $D_{vo.9}$ | $D_{32}$ | LIQUID FLOW (GPM) | RELATIVE SPAN |
|---|---|---|---|---|---|---|---|---|
| WATER | | 0 | 120 | 36 | 362 | 71 | 0.6 | 2.72 |
| POLYOX 301 | 4.0 | 100 | 261 | 63 | 433 | 105 | 0.7 | 1.42 |
| POLYOX 1150 | 0.9 | 100 | 175 | 49 | 402 | 93 | 0.7 | 2.02 |
| POLYOX 750 | 0.3 | 100 | 154 | 44 | 389 | 85 | 0.7 | 2.24 |
| POLYOX 80 | 0.2 | 100 | 139 | 39 | 379 | 78 | 0.7 | 2.45 |

TABLE 3A

| SOLUTION | MOLE RATIO AcAm/ DMAEA.BCQ/ DMAEA.MCQ | % ACTIVE | $D_{vo.5}$ | $D_{vo.1}$ | $D_{vo.9}$ | $D_{32}$ | LIQUID FLOW (GPM) | RELATIVE SPAN |
|---|---|---|---|---|---|---|---|---|
| WATER | | 0 | 120 | 36 | 362 | 71 | 0.6 | 2.72 |
| POLYMER 1 | 65/25/10 | 20 | 216 | 45 | 420 | 93 | 0.7 | 1.74 |
| POLYMER 2 | 20/50/30 | 20 | 156 | 41 | 4 | 69 | 0.7 | 2.30 |
| POLYMER 3 | 90/10/00 | 15 | 284 | 63 | 442 | 118 | 0.7 | 1.33 |

TABLE 4

| SOLUTION | MOLECULAR WEIGHT (MILLIONS) | % ACTIVE | $D_{vo.5}$ | $D_{vo.1}$ | $D_{vo.9}$ | $D_{32}$ | LIQUID FLOW (GPM) | RELATIVE SPAN |
|---|---|---|---|---|---|---|---|---|
| WATER | | 0 | 105 | 29 | 342 | 57 | 0.7 | 2.98 |
| POLYOX 301 | 4.0 | 100 | 271 | 59 | 438 | 109 | 0.8 | 1.40 |
| POLYOX 1150 | 0.9 | 100 | 136 | 37 | 380 | 74 | 0.8 | 2.52 |
| POLYOX 750 | 0.3 | 100 | 126 | 35 | 365 | 60 | 0.7 | 2.62 |
| POLYOX 80 | 0.2 | 100 | 111 | 30 | 344 | 61 | 0.7 | 2.83 |
| UCARFLOC 300 | 4.0 | 100 | 268 | 58 | 436 | 109 | 0.8 | 1.41 |
| UCARFLOC 309 | 8.0 | 100 | 286 | 68 | 442 | 120 | 0.8 | 1.31 |

TABLE 4A

| SOLUTION | MOLE RATIO AcAm/ DMAEA.BCQ/ DMAEA.MCQ | % ACTIVE | $D_{vo.5}$ | $D_{vo.1}$ | $D_{vo.9}$ | $D_{32}$ | LIQUID FLOW (GPM) | RELATIVE SPAN |
|---|---|---|---|---|---|---|---|---|
| WATER | | 0 | 15 | 29 | 342 | 57 | 0.7 | 2.98 |
| POLYMER 1 | 65/25/10 | 20 | 178 | 36 | 407 | 77 | 0.8 | 2.08 |
| POLYMER 2 | 20/50/30 | 20 | 140 | 33 | 388 | 69 | 0.8 | 2.54 |
| POLYMER 3 | 90/10/00 | 15 | 267 | 46 | 436 | 98 | 0.8 | 1.46 |
| POLYMER 4 | 90/05/05 | 10 | 194 | 38 | 413 | 83 | 0.7 | 1.93 |
| POLYMER 5 | 80/20/00 | 20 | 115 | 31 | 360 | 54 | 0.8 | 2.86 |
| POLYMER 6 | 70/15/15 | 20 | 143 | 34 | 388 | 71 | 0.8 | 2.44 |

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. The claims are meant to cover the claimed components and steps in any sequence which is effective to meet the objectives there intended, unless the context specifically indicates the contrary.

We claim:

1. A process for reducing the concentration of $NO_x$ in a combustion effluent by selective noncatalytic reduction in the gas phase, comprising:

preparing an aqueous solution of a $NO_x$-reducing composition comprising an NH-containing composition which comprises a member selected from the group consisting of ammonia, urea, carbamates, ammonium carbonate, ammonium bicarbonate, cyanurates, ammonium salts of organic acids, and mixtures thereof, and also including a water-dispersible polymer selected from the group consisting of homopolymers of acrylic acid with RSV values of at least 10, homopolymers of acrylamide with RSV values of at least 10 and copolymers of acrylic acid and acrylamide with RSV values of at least 10, sodium acrylate acrylamide copolymers with RSV values of at least 10, sulfonmethylated acrylamide/acrylamide/acrylic acid terpolymers of RSV of at least 18, alkylene oxide polymers and copolymers, and mixtures thereof said water-dispersible polymer having a molecular weight of greater than 500,000; and dispersing the aqueous solution comprising from 1 to 30% of said NH-containing composition as droplets within the effluent which contains $NO_x$, the amount of the water-dispersible polymer being effective to increase the size of the droplets over what they would be without the polymer and narrow the distribution of droplet sizes, at an effluent temperature of from 900° to 1300° C., wherein the average droplet size is within the range of from about 5 to about 10,000 microns Sauter mean diameter, to thereby reduce the concentration of $NO_x$ in the effluent by selective gas phase reaction of the NH-containing composition with the $NO_x$.

2. A process according to claim 1 wherein the relative span of droplet sizes is less than 2, the relative span being the quotient of $(D_{v0.9}-D_{v0.1})/D_{v0.5}$, wherein $D_{v0.9}$ is a value indicating a droplet size at 90% of the total liquid volume of the cumulative distribution curve, $D_{v0.1}$ is a value indicating a droplet size at 10% of the total liquid volume on the cumulative distribution curve, and $D_{v0.5}$ is the volume median diameter of all droplets.

3. A process according to claim 2 wherein the median droplet size is within the range of from about 200 to 1000 microns.

4. A process according to claim 1 wherein the polymer comprises a latex of an ionic polymer.

5. A process according to claim 1 wherein said polymer is employed in an amount of from about 10 to about 1000 ppm.

6. A process according to claim 1 wherein the step of dispersing the aqueous solution as droplets in the effluent comprises:

preparing a two-phase pollutant-reducing mixture which comprises a gaseous component and a liquid component comprising said aqueous solution and introducing it at its characteristic sonic velocity into a passage containing a combustion effluent at a temperature effective for reduction of the pollutant.

7. A process according to claim 6 wherein the mixture is injected at liquid droplet sizes effective to enable evaporation prior to impingement on a surface within or defining said passage.

8. A process according to claim 6 wherein the pollutant-reducing mixture is injected at a pressure of between 30 and 60 psi.

9. A process according to claim 8 wherein the gaseous and liquid components are mixed in amounts effective to provide from 30 to 80 volume percent of the gaseous component.

10. A process according to claim 9 wherein the gaseous component comprises air, steam, or a mixture thereof.

* * * * *